United States Patent [19]

Dietrich et al.

[11] 4,080,646
[45] Mar. 21, 1978

[54] CHOPPER ARRANGEMENT HAVING A SWITCHING DEVICE TO TURN OFF THE CHOPPER

[75] Inventors: Rolf Dietrich, Hofheim; Egon Gahler, Frankfurt, Zeilsheim, both of Germany

[73] Assignee: Braun Aktiengesellschaft, Frankfurt am Main, Germany

[21] Appl. No.: 648,631

[22] Filed: Jan. 13, 1976

[30] Foreign Application Priority Data

Mar. 26, 1975   Germany .............................. 2513471

[51] Int. Cl.² ......................................... H02M 3/335
[52] U.S. Cl. ......................................... 363/23; 320/1;
   315/241 P; 354/145; 363/124
[58] Field of Search ........................ 320/1; 321/2, 15;
   354/145; 315/219, 241 P; 363/22, 23, 24, 25, 124

[56] References Cited

U.S. PATENT DOCUMENTS

| 3,134,066 | 5/1964 | Townsend | 320/1 |
| 3,213,344 | 10/1965 | Jensen | 320/1 |
| 3,229,158 | 1/1966 | Jensen | 315/241 P |
| 3,297,960 | 1/1967 | Massey | 321/2 |
| 3,644,818 | 2/1972 | Paget | 315/241 P |

FOREIGN PATENT DOCUMENTS 1,152,295   5/1969   United Kingdom ..................... 321/2

*Primary Examiner*—William M. Shoop
*Attorney, Agent, or Firm*—Sughrue, Rothwell, Mion, Zinn and Macpeak

[57] ABSTRACT

A chopper circuit arrangement for charging an electronic flash discharge capacitor and for turning off the chopper is disclosed. The arrangement operates from a D.C. source and includes chopper transistors and a transformer operating together as a converter. Regenerative means, including a feedback winding of the transformer, function to charge the flash discharge capacitor. The arrangement includes transistors disposed across the chopper transistors to block or hold the converter off. These blocking transistors are activated when the voltage across the discharge capacitor has achieved a predetermined value. The arrangement includes means for effectuating blocking of the converter only during the off condition of the chopper. The arrangement also includes means for delaying the charge of the discharge capacitor, after discharge, for a predetermined time.

13 Claims, 1 Drawing Figure

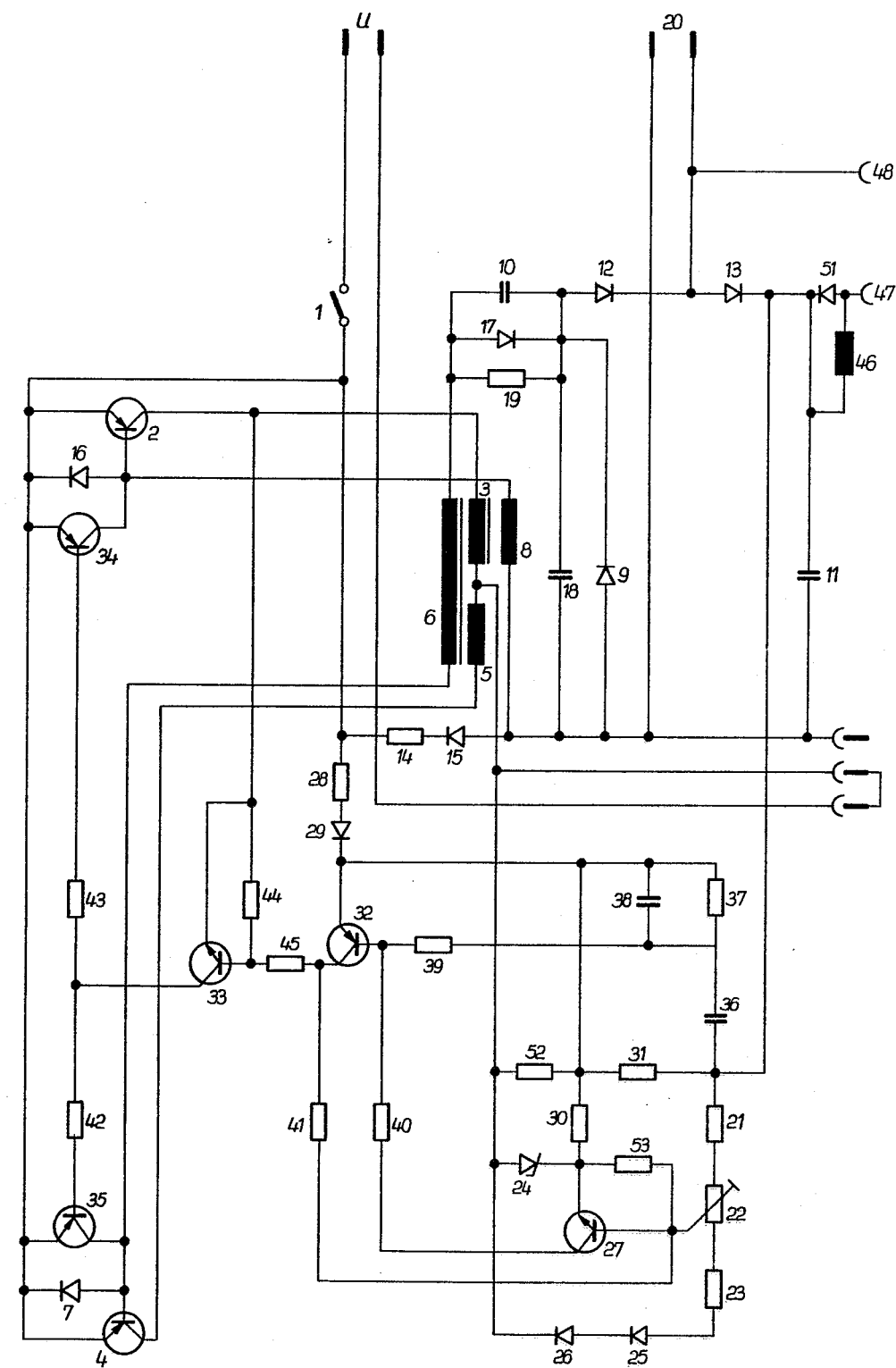

CHOPPER ARRANGEMENT HAVING A SWITCHING DEVICE TO TURN OFF THE CHOPPER

FIELD OF THE INVENTION

The invention pertains to a chopper arrangement including switching device for turning off a chopper used for charging the storage or discharge capacitor of an electronic flash unit.

BACKGROUND OF THE INVENTION

Choppers are often used with battery-powered electronic flash units to achieve a most effective transformation of the D.C. battery voltage. Primarily, mechanical and transistorized choppers are used for this function. The use of an electronic chopper circuit or converter is particularly advantageous since any maintenance of mechanical contacts is eliminated and a long life span is achieved. The switching frequency for D.C. to D.C. chopper converters can be chosen over a wide range. Transformer size or volume decreases as the switching frequency increases. Based on their operating characteristics, one differentiates between single-ended and double-ended, shunt-series, on the one hand, and push-pull chopper converter configurations, on the other hand. Basically, all such circuits consist of one or two transistors and of oscillation transfer-means. Through the action of these transistors, a D.C. voltage is alternately applied to, and removed from the primary winding of the oscillation transfer means. The resulting alternating voltage has a rectangular waveform and is thereby transformable.

There have been numerous choppers and oscillators proposed which are suitable for alarm systems, fluorescent lamps, high voltage blinkers, radio receivers and flash units. [Siemens - Halbleiter-Schaltbeispiele, Ausgabe April 1962, Seite 21 bis 35; (Siemens Semiconductor Circuit Examples, April 1962 Issue pages 21–35); H. Pitsch, Lehrbuch der Funkemphangstechnik II, 4. Auflage, 1964, Sec. 965, (H. Pitsch, Text of Radio Receiving Technology II, 4th edition 1964, p 965; G. Bender, Das Electronische Fotoblitzgeraete, 2. Auflage 1962, S. 57, (G. Bender, The Electronic Photo Flash Unit, 2nd edition, 1962, p. 57)]. These choppers and oscillators are not optimally usable in electronic flash units since they operate continuously, thus utilizing excess energy.

A circuit configuration which interrupts the charging sequence of the flash capacitor, and thus limits any unnecessary energy consumption, is also known. [F. Eberhard, Ein Netzgeraet fuer Profiblitzgeraete, Funkschau 1975 Heft 5, S. 64–66, (F. Eberhard, A Power Supply for a Professional Flash Unit, Radio Show Volume 5, pgs 64–66)]. This voltage regulation circuit is interrupted upon reaching the desired output or charging voltage of the flash capacitor by shutting off the thyristor controlling the charging current. This circuit is intended for mains-fed power supplies and is therefore not optimally usable for battery-driven flash-unit applications, since even upon turn off of the charging thyristor, energy would still be consumed.

OBJECTS OF THE INVENTION

It is therefore an object of the present invention to provide a chopper control circuit for battery-driven electronic flash-units.

It is also an object of the present invention to provide precise means for automatically blocking the chopper portion of a capacitor charge circuit when a predetermined voltage is achieved across the flash discharge capacitor.

It is a further object of the present invention to allow chopper action in a capacitor charge circuit to recommence when the voltage across the charged capacitor drops below a predetermined limit.

It is an additional object of the present invention to provide precise means for automatically blocking the chopper portion of a capacitor charge circuit when a predetermined voltage is achieved across the discharge capacitor, which blocking action is applied only to one of chopper transistors in its non-conducting state.

It is still another object of the present invention to provide a predetermined delay in the commencement of operation of a chopper control circuit for a flash discharge capacitor, which delay is effective when the capacitor has been discharged.

SUMMARY OF THE PRESENT INVENTION

These objects are achieved, according to the invention, by combining converter transistors with the chopper primary winding in such a way as to block primary current flow when the desired charging voltage for the flash discharge capacitor is reached. In one version of the invention, the converter transistors are permitted to conduct again when the discharge (flash) capacitor voltage drops below a lower limit. A further refinement of the invention results in the converter transistor turn-off taking place during the time the transistors are not conducting. An advantage particularly realized through the invention is a shut-off which takes place not at the time of transistor peak current flow, but which is synchronized with the non-conducting period of the cycle.

In accordance with the invention, a chopper circuit arrangement for charging an electronic flash discharge capacitor comprises a D.C. electrical source, a transformer having a primary winding with first and second outer terminals, a first chopper means coupled in series to the first outer terminal of the primary winding and a second chopper means coupled in series to the second outer terminal of the primary winding. The first and second chopper means also being connected together and coupled to the D.C. electrical source with the transformer and first and second chopper means forming a converter. The arrangement also includes an electronic flash discharge capacitor, regenerative means coupled to the converter for charging the flash discharge capacitor and means for blocking the action of the converter to prevent further charge of the discharge capacitor when the voltage across the flash discharge capacitor reaches a predetermined value.

For a better understanding of the present invention together with further objects thereof, reference is made to the following detailed description and accompanying drawings, while the scope of the invention will be pointed out in the appended claims.

BRIEF DESCRIPTION OF THE DRAWING

The sole FIGURE is a schematic diagram of the chopper arrangement of the present invention.

DETAILED DESCRIPTION OF THE INVENTION

Referring initially to the chopper portion of the FIGURE when the switch 1 is closed, then the current can flow through the push-pull converter connected to the D.C. voltage, U. The converter consists substantially of transistors 2 and 4, as well as of both halves 3 and 5 of the transformer primary. The battery potential U is applied across the collector-emitter path of the transistor 2 to the first half of the primary winding 3, and across the collector-emitter path of the transistor 4 to the second half of the primary winding 5 of the transformer (preferably a step-up type). The residual collector-emitter current flowing through the primary windings 3 and 5 induces a voltage across the secondary winding 6, which, in turn, results in current flow to the base of transistors 2 and 4. For current-controlled, push-pull converters, the transistor having the higher residual current and lower emitter base drive requirement is brought into conduction first.

Assume, for example, that this is the transistor 2, then the residual current flowing through the primary winding 3 induces a voltage. This voltage produces a current flow which proceeds from the lower end of the secondary winding 6, positive during this phase, through the diode 7, the base-emitter junction of the transistor 2, the feedback winding 8, the diode 9 and the doubling capacitor 10, back to the upper end of the secondary winding 6.

This current is the charging current for the voltage doubling capacitor 10 and, simultaneously, the forward base current for the transistor 2. Through this charging current feedback, the transistor 2 is brought completely into conduction, which, in turn, causes the battery potential U to be applied across the primary winding 3. The magnetizing current flowing in the primary winding 3 increases approximately linearly with time, until the transformer is saturated. When saturation is reached, no further current increase takes place, and, through the effect of the feedback, the transistor 2 is cut off.

The now non-loaded transformer forms a resonant circuit with its winding capacitance and is driven as an oscillator by the energy stored in the magnetic field. The potential across the transformer then changes sign. The resultant voltage across the secondary winding 6 is now additive with the voltage across the doubling capacitor 10. When the sum of the two voltages exceeds the voltage across the electrolytic flash capacitor 11, the diodes 12 and 13 conduct. The resultant current then flows from the now positive upper end of the secondary winding 6, through the voltage doubling capacitor 10, diodes 12 and 13, the electrolytic flash capacitor 11, the feedback winding 8, and the emitter base junction of the transistor 4 to the now negative lower end of the secondary winding 6. This forward base current causes the transistor 4 to begin conducting so that a fraction of the battery potential U is applied across the primary segment 5. The voltage induced thereby in the secondary winding 6 reinforces the base current, the transistor becomes fully conductive and switches the battery voltage U over to the primary winding portion 5. The transformer is again driven into saturation (causing the transistor 4 to be cut off) and the reverse voltage resulting from the collapsing field turns the transistor 2 on again. In this manner, the charging cycles of the doubling capacitor 10 and the electrolytic flash capacitor 11 alternate.

The charging current for the capacitors 10 and 11 simultaneously becomes a base current for transistors 2 and 4. This current control technique provides for a maximum value of the transistor-controlled battery current, when the capacitors are discharged. The charging current for the voltage doubler capacitor 10 is not, however, always adequate to maintain the transistor 2 in saturation. A forward bias reinforcement potential control is therefore provided by the feedback winding 8 in order to minimize the transistor losses. During the conduction phase of the transistor 2, a potential is induced across the feedback winding 8 which, in turn, forward biases the transistor, i.e., causes the base to become even more negative than the emitter to the point where it saturates, with only the collector-emitter saturation voltage remaining across the transistor. The upper end of the winding 8 is then negative, while its lower end is positive.

The feedback resistor 14 reduces the high (forward) base current by the combined current and voltage control to a degree that results in optimum operation, i.e., only small transformer losses are realized. During the off period of the transistor 2, there occurs also an induced voltage across the feedback winding 8 as a result of the current flow in the primary winding segment 5. The upper end of the winding 8 becomes positive at this time. Diode 15 acts to prevent a short circuit of the feedback potential through the diode 16 and thus minimizes the transformer loading during this phase.

The voltage doubling capacitor 10 is discharged during the charging phase for the electrolytic flash capacitor. Diode 17 prevents the application of a reverse charge to the voltage doubling capacitor 10. An improved performance which in particular results in shortening the period between flashes, is thereby achieved.

As a result of the current control, the forward base current which also charges the capacitors decreases with increased capacitor charge. This is particularly true for the electrolytic flash capacitor 11. If the flash unit is turned on when the electrolytic flash capacitor 11 is nearly fully charged, difficulties arise in starting oscillations due to the small control current available under these conditions. The capacitor 18 improves the oscillatory start-up process when the electrolytic flash capacitor 11 is charged by providing a momentary low-ohmic control path. A short start-up impulse, adequate for a reliable start, is delivered through a path starting at the upper end of the secondary winding 6, through the diode 17, the capacitor 18, the feedback winding 8, and the diode 16 to the emitter-base junction of the transistor 4. The resistor 19 provides a discharge path for the voltage doubling capacitor 10, when switching over from battery operation to an AC source. This prevents the capacitor voltage from becoming active at the terminal 20. The voltage on the electrolytic flash capacitor 11 is blocked from reaching the terminal 20 by the diode 13.

Referring now to the automatic shut-off mechanism push-pull converter applications, the electrolytic flash condenser 11 is charged to twice the potential prevailing on the converter transformer secondary winding 6. The time interval between flash readiness is shortened by selecting the converter transformer turns-ratio so that the secondary voltage permits the charge of the electrolytic flash capacitor 11 to a voltage considerably higher than the rated or required voltage. When the required value of 360 volts across the electrolytic flash capacitor 11 is reached, then, according to the invention, an automatic electronic regulation mechanism shuts the converter off and inhibits further charging of the capacitor 11. The converter is switched on again when, due to leakage currents and loading, the capacitor charge drops below a lower voltage limit. In this manner, the current drain from the battery subsequent to the charging of the capacitor 11 is reduced to short recharge intervals.

The voltage divider 21, 22, 23 derives a voltage proportional to the charge on the electrolytic flash capacitor 11. The operating voltage of the zener diode 24 serves as a reference voltage. The potentiometer 22 is adjusted so that a voltage of 360 volts across the electrolytic flash capacitor 11 results in a voltage across the lower portion of the potentiometer 22, the resistor 23, and the diodes 25 and 26, which exceeds the reference voltage by the base-emitter voltage required, thus forward biasing the transistor 27. This causes transistor 27 to conduct current to a certain degree. Diodes 25 and 26 serve to provide a slightly over-compensating temperature compensation so as to lower the turn-off threshold for the voltage or charge applied to the electrolytic capacitor 11 with increasing temperature. Improved long-term stability is achieved for the zener diode 24 by establishing an operating current of approximately 700 microamperes prior to turn-off. This current to the zener diode 24 is partially supplied by the battery through the resistor 28, the diode 29 and the resistor 30, and partially through the resistors 31 and 30, upon an increase of the voltage across the flash-light electrolytic capacitor 11. The diode 29 inhibits any current drain from the electrolytic flash capacitor 11 through resistor 28, if the battery potential should fall below the zener operating voltage.

The collector current resulting from the forward biasing of transistor 27, causes the transistor 32 to be forward biased also. The collector current which now begins to flow in transistor 32 is coupled back through resistor 41 to the base of transistor 27, causing a rapid regenerative switching to take place. The collector of transistor 32 is also coupled to the base of transistor 33 by way of resistor 45.

Switching the transistor 33 on, results in a base current or forward biasing of the cut-off transistors 34, 35. These cut-or hold-off transistors 34 and 35 (clamps) are forward biased (into saturation) so that the resultant collector-emitter remnant voltage is less than the required forward base-emitter voltage for the start-up of the converter transistors 2 and 4. The converter is now turned off.

In order not to require the cut-or hold-off transistors 34 and 35 to handle the high control currents associated with the conduction phase of the converter transistors 2 and 4, synchronization with the non-conducting phase of one of the transistors is imposed. This permits the use of much cheaper transistors for the hold-off units. This is achieved by deriving, or controlling, the collector-emitter supply potential for the transistor 33 from, or by, the converter transformer primary winding 3. If the transistor 2 is in the non-conducting phase, the current flowing in the transistor 4 results in an induced voltage across the winding 3, which, in concert with the battery voltage, provides the collector-emitter supply voltage for the transistor 33. Through forward biasing of the base of the transistor 33, the transistor 34 now becomes conductive or saturates, thus preventing the transistor 2 from turning on again. The voltage doubling capacitor 10 is no longer recharged; therefore, the resulting secondary voltage occuring on the secondary winding upon conduction of the transistor 4 without the doubling capacitor voltage being added thereto, fails to exceed the residual voltage across the electrolytic flash capacitor 11. This results in no further base or bias current flow, and the transistor 4 fails to turn on, i.e., the converter is shut-off.

The blanking of the recharging current occurs in the following manner. After discharge of the electrolytic flash capacitor 11 through the non-illustrated flash tube, the converter immediately turns on, providing the maximum charging current for recharging the capacitor. This causes a current to continue to flow through the discharge (flash) tube, thus maintaining the radiation of light. This effect results not only in erroneous exposures, but also leads to the destruction of the discharge tube and the converter.

In order to prevent this, the recharging is interrupted or delayed approximately 0.3 seconds. Specifically, this occurs by virtue of the capacitor 36 being charged during the charging cycle through the resistors 37 and 30, the diode 24, the battery, the emitter-base junction of the transistors 2 and the feedback winding 8 to the potential prevailing on the capacitor 11. During the discharge of the electrolytic flash capacitor 11, the capacitor 36 is discharged through the resistors 37 and 31. This discharge current causes the capacitor 38 to charge, thus providing a forward negative base current for transistor 32. The capacitor 38 continues to discharge through resistors 37 and 39, until the emitter-base forward biasing of transistor 32 can no longer be sustained for the latter to be conductive. At this point, the converter starts up and the charging of the electrolytic flash capacitor 11 begins. The collector-emitter supply voltage for the transistor 33 is provided completely by the battery voltage, which is fully effective, since the converter is not oscillating and thus not building up a bucking potential at the primary winding 3. The period of the suppression is directly dependent upon the voltage across the electrolytic capacitor 11. The blanking period is greatest when the capacitor 11 is completely discharged. In view of this current control, the greatest converter recharging rate is obtained.

The function of the inductor 46 is to reduce the current buildup rate at the beginning of ionization within the discharge tube and to reduce the peak current, while the diode 51 prevents the development of an excessive back EMF.

In the FIGURE, terminals 20 are for coupling to an AC source, and terminals 47 and 48 are normally coupled to camera shutter contacts during connection for flash exposure.

While the invention has been particularly shown and described with reference to the preferred embodiments thereof, it will be understood by those skilled in the art that various modifications and changes in form and detail may be made therein without departing from the true spirit and scope of the present invention.

What is claimed is:

1. A chopper circuit arrangement for charging an electronic flash discharge capacitor comprising:
   a D.C. electrical source;
   a transformer having a primary winding with first and second outer terminals;
   a first chopper means coupled in series to said first outer terminal of said primary winding;
   a second chopper means coupled in series to said second outer terminal of said primary winding, said first and second chopper means also being connected together and coupled to said D.C. electrical source, said transformer and first and second chopper means forming a converter;
   an electronic flash discharge capacitor;

regenerative means coupled to said converter for charging said flash discharge capacitor;

means for blocking the action of said converter to prevent further charge of said flash discharge capacitor when the voltage across said flash discharge capacitor reaches a predetermined value; and means for permitting said blocking means to act only during the non-conducting phase of one said chopper means of said converter.

2. The chopper circuit arrangement of claim 1 wherein said transformer primary is center-tapped and said first and second chopper means are transistors.

3. The chopper circuit arrangement of claim 1 wherein said transformer includes a secondary winding and a feedback winding and said regenerative means includes means for coupling said feedback winding to one of said chopper means and includes a voltage doubling capacitor disposed in a circuit path between said transformer secondary and said flash capacitor.

4. The chopper circuit arrangement of claim 1 wherein said predetermined voltage value is a first predetermined value and the arrangement includes means for preventing action of said blocking means and also means for starting action of the converter and the regenerative charging means when the charged voltage across said discharge capacitor drops below a second predetermined value which is lower than the first predetermined value, so as to recharge the discharge capacitor to said first predetermined value.

5. The chopper circuit arrangement of claim 1 including means for providing a voltage proportional to the voltage across said flash capacitor, means for providing a reference voltage, means for comparing the proportional voltage to said reference voltage and for providing a blocking signal when said proportional voltage exceeds said reference voltage, first and second blocking means disposed across said first and second chopper means for blocking action of said chopper means and means responsive to said blocking signal for actuating said first and second blocking means.

6. The chopper circuit arrangement of claim 1 wherein said blocking means includes drive means and wherein said drive means is responsive to an output terminal of the transformer primary.

7. A chopper circuit arrangement of claim 1 wherein said chopper means are series transistors, said means for blocking include transistors disposed across the base to emitter junctions of said chopper transistors, a drive circuit for said blocking transistors including an output drive transistor wherein said means for permitting said blocking means to act only during the non-conducting phase of said chopper means of said converter includes means coupled between one terminal of said transformer primary and said output drive transistor of said drive circuit.

8. A circuit arrangement in accordance with claim 1 wherein said arrangement includes means for delaying recharge of said flash discharge capacitor for a predetermined time interval following discharge thereof.

9. A chopper circuit arrangement in accordance with claim 8 wherein said blocking means includes a first capacitor subject to being fully charged during a charge cycle of said arrangement, and a second capacitor subject to receiving the stored charge from said first capacitor during a discharge cycle of said arrangement, said second capacitor operating to inactivate said blocking means until the transferred charge leaks off and the voltage across said second capacitor drops to a predetermined level.

10. A chopper circuit arrangement for charging an electronic flash discharge capacitor comprising:

a D.C. electrical source;

a transformer having a primary winding and first and second outer terminals;

a first chopper transistor coupled in series to said first outer terminal of said primary winding;

a second chopper transistor coupled in series to said second outer terminal of said primary winding;

said first and second chopper transistors also being connected together and coupled to said D.C. electrical source, said transformer and said first and second chopper transistors forming a converter;

an electronic flash discharge capacitor;

regenerative means coupled to said converter for charging said flash discharge capacitor;

a voltage divider connected to said electronic flash discharge capacitor for providing a voltage proportional to the voltage across said flash discharge capacitor;

a Zener diode for providing a reference voltage;

a transistor stage for comparing the proportional voltage to said reference voltage and for providing a blocking signal when said proportional voltage exceeds said reference voltage, said Zener diode being arranged in the emitter circuit and said voltage divider being arranged in the base circuit of said transistor stage, said blocking signal being provided in the collector circuit of said transistor stage by the turn-on of said transistor stage when the voltage from the voltage divider exceeds the Zener voltage;

first and second blocking transistors disposed directly across said first and second chopper transistors respectively for blocking action of said first and second chopper transistors; and means including at least one normally off transistor responsive to said blocking signal for turning on said first and second blocking transistors.

11. The chopper circuit arrangement of claim 10 wherein said voltage divider includes means for adjusting the proportional voltage supplied by said divider.

12. The chopper circuit arrangement of claim 10 wherein said voltage divider includes temperature compensating diodes.

13. In a chopper circuit arrangement for charging an electronic flash discharge capacitor of the type having a D.C. source, chopper means responsive to said D.C. source and an oscillation transfer means, the improvement comprising:

means for blocking the action of said chopper means to prevent further charge of said flash discharge capacitor when the voltage across said flash discharge capacitor reaches a predetermined level; and means for permitting said blocking means to act only during a non-conducting phase of said chopper means;

wherein said chopper means includes push-pull transistors, said oscillation transfer means includes a step-up transformer having a feedback winding, and said blocking means includes transistors disposed across said push-pull transistors; and said arrangement also including a threshold circuit responsive to the voltage across said flash discharge capacitor for activating said blocking transistors.

* * * * *